L. C. E. JONES.
POT POLISHER AND SCRAPER.
APPLICATION FILED MAR. 13, 1913.

1,087,776.

Patented Feb. 17, 1914.

Witnesses
Chas. R. Bealle.
R. Smith.

Inventor
L. C. E. Jones.

By Randolph Jr. Attorney

UNITED STATES PATENT OFFICE.

LUCY C. E. JONES, OF TAMPA, FLORIDA.

POT POLISHER AND SCRAPER.

1,087,776.  Specification of Letters Patent. Patented Feb. 17, 1914.

Application filed March 13, 1913. Serial No. 754,053.

*To all whom it may concern:*

Be it known that I, LUCY C. E. JONES, a citizen of the United States, residing at Tampa, in the county of Hillsboro and State of Florida, have invented certain new and useful Improvements in Pot Polishers and Scrapers; and I do hereby declare the following to be a full, clear, and exact description of the invention, such as will enable others skilled in the art to which it appertains to make and use the same.

This invention relates to improvements in a pot polisher or scraper.

The object of the invention is to provide a polisher or scraper composed of a plurality of linked metal rings connected at intervals by blocks of stone, the metal and stone forming an effective abrading or cutting medium for removing foreign matter which accumulates in kettles, or pans, pots or the like articles.

The invention also comprehends improvements in the specific details of construction and arrangement of parts which will be hereinafter described, and particularly pointed out in the claims.

Figure 1:
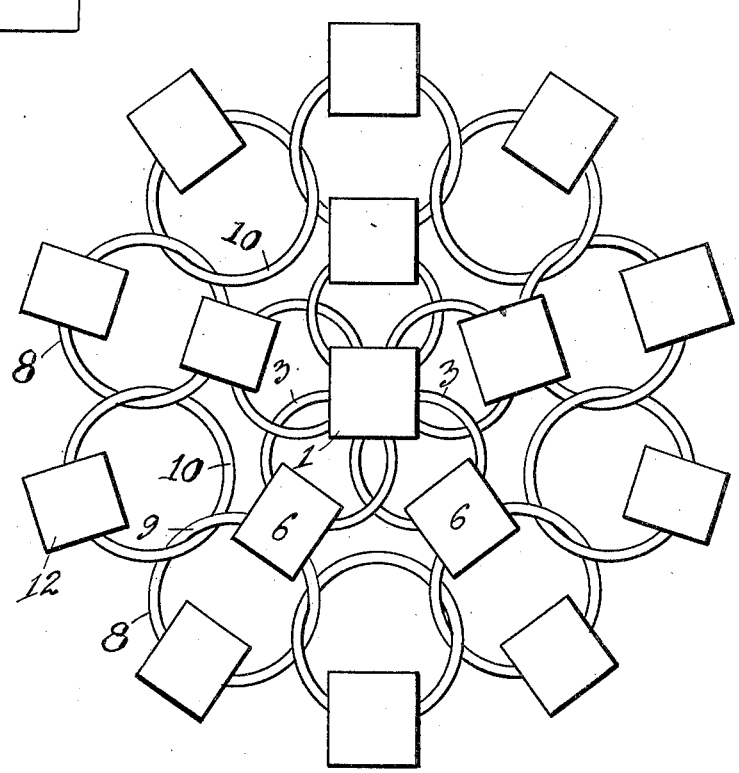
Figure 2:
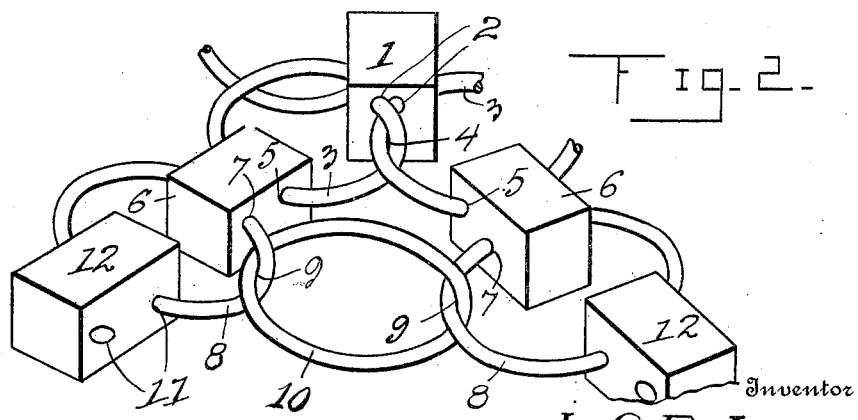

In the drawing—Figure 1 is a plan view of my improved polisher. Fig. 2 is a perspective detail view of a portion of the device.

The same numerals refer to like parts in all the figures.

1 indicates a centrally disposed square or similarly shaped element, having a number of substantially sharp corners to cause a cutting action when the device is in operation. The central element is preferably in the nature of stone, or the like material, and it is provided with a plurality of openings 2, through which pass metal rings 3, which are interlooped with each other to form flexible connections, as indicated at 4. The rings 3, form an intermediate web like portion, and each of them passes through an opening 5, in an element 6, shaped similar to the element 1, and made of like material. The elements 6, are also provided with other openings 7, through which pass metal rings 8, the latter being interlooped at 9, with other intermediate rings 10, to form a flexible connection between the said rings and the elements 6.

The rings 8 and 10, pass through openings 11, in elements 12, which are similar to the elements 1 and 6. The elements 12, and the rings 8 and 10, form the outer edge of the device, and as they are all linked, or interlooped, it is evident the device may assume a folded or irregular shape to fit into crevices in the pots or pans being polished. By forming the elements or blocks 1, 6 and 12, of the shape shown, the corners will serve to cut the foreign substance from the pots, and as they are of stone, they will polish and clean the surface. The stone elements and the metal rings present a series of angular surfaces, which when wiped around the pot will effectually fit into the crevices and will at the same time cut and polish the pans. The construction is such that the entire device is flexible and can be folded so that the stone elements and the rings will be free to be moved and thrown around on the surface being cleaned which tends to produce a series of knocks which will remove all hard accumulated matter.

My invention is extremely simple in construction and effective in operation.

What I claim is—

1. A polisher and cleaning device comprising a plurality of interlooped rings, and a plurality of stone blocks, having openings through which the rings pass.

2. A polishing and cleaning device comprising a plurality of interlooped metal rings, a stone block formed with openings and disposed in the center of the said interlooped rings, the latter passing through the openings in the stone block, a series of stone blocks having openings through which the outer portions of the rings pass, and a series of interlooped rings engaging the latter stone blocks.

3. A polishing and cleaning device, comprising a centrally disposed stone block, formed with openings, a series of rings, engaging the openings, said rings being interlooped with each other, a series of stone blocks formed with openings, the interlooped rings engaging the openings in the series of stone blocks, a second series of rings engaging the openings in the series of stone blocks, intermediate rings interlooped with the second series of rings, and an outer series of stone blocks formed with openings through which pass second series of rings and the intermediate series of rings, all the blocks being free to move on the respective rings.

In testimony whereof I affix my signature in presence of two witnesses.

LUCY C. E. JONES.

Witnesses:
H. D. WEBSTER,
E. W. PIERCE.

Copies of this patent may be obtained for five cents each, by addressing the "Commissioner of Patents, Washington, D. C."